(12) United States Patent
Hinata et al.

(10) Patent No.: US 6,812,974 B1
(45) Date of Patent: Nov. 2, 2004

(54) LIQUID CRYSTAL DEVICE AND ELECTRONIC EQUIPMENT

(75) Inventors: Shoji Hinata, Matsumoto (JP); Yoshikatsu Imazeki, Matsumoto (JP); Hiroyuki Hosogaya, Nagano-ken (JP); Shinji Fujisawa, Nagano-ken (JP)

(73) Assignee: Seiko Epson Corporation (JP)

( * ) Notice: Subject to any disclaimer, the term of this patent is extended or adjusted under 35 U.S.C. 154(b) by 575 days.

(21) Appl. No.: 09/606,723

(22) Filed: Jun. 29, 2000

(30) Foreign Application Priority Data

Jun. 29, 1999 (JP) .............................. 11-183746
Jun. 14, 2000 (JP) ........................ 2000-178350

(51) Int. Cl.[7] ...................... G02F 1/1335; G02F 1/1333
(52) U.S. Cl. .......................................... 349/12; 349/158
(58) Field of Search ...................... 349/12, 158, 61–62; 345/173

(56) References Cited

U.S. PATENT DOCUMENTS 5,870,160 A * 2/1999 Yanagawa et al. .......... 349/141
5,907,375 A * 5/1999 Nishikawa et al. ........... 349/12
6,369,865 B2 * 4/2002 Hinata ......................... 349/12

FOREIGN PATENT DOCUMENTS

| JP | 52-148082 | 5/1951 |
| JP | 7-295744 | 11/1995 |
| JP | 09-005744 | 1/1997 |
| JP | 9-073072 | 3/1997 |
| JP | 9-090316 | 4/1997 |
| JP | 10-073805 | 3/1998 |
| JP | 1-167097 | 6/1999 |
| JP | 11-174972 | 7/1999 |

* cited by examiner

*Primary Examiner*—Dung Nguyen
(74) *Attorney, Agent, or Firm*—Harness, Dickey & Pierce, P.L.C.

(57) ABSTRACT

A liquid crystal device capable of input operations comprising a liquid crystal panel 2 and an input unit 4 stacked thereon. The input unit 4 has a front-side substrate 8a lying at a front side and a back-side substrate 8b opposing the front-side substrate 8a. The liquid crystal panel 2 has a first substrate 22a lying at the front side and a second substrate 22b lying at the back side. Since the front-side substrate 8a and the back-side substrate 8b of the input unit 4 are flexible, the input unit 4 is thin and lightweight. Since the second substrate 22b of the liquid crystal panel 2 is flexible, the formation of a distortion pattern in the liquid crystal device is prevented when pressing operation of the input unit 4 is performed.

13 Claims, 8 Drawing Sheets

LIQUID CRYSTAL DEVICE AND ELECTRONIC EQUIPMENT

BACKGROUND OF THE INVENTION

1. Technical Field of the Invention

The present invention relates to liquid crystal devices for displaying various images, e.g., letters, figures, and drawings, by controlling alignment of liquid crystal enclosed between a pair of substrates, and particularly, to a liquid crystal device provided with an input unit such as a touch panel.

2. Description of the Related Art

With the spread of compact electronic information devices, such as personal digital assistants and palmtop computers, liquid crystal devices capable of input operations provided with transparent input sections overlaid thereon have been widely used.

As shown in FIG. 12, a known liquid crystal device capable of input operations is formed by bonding an input unit 94 including a flexible front substrate 94a and a back substrate 94b bonded to the front substrate 94a with a sealant 99, to a liquid crystal panel 92, including a first substrate 92a and a second substrate 92b bonded to the first substrate 92a with a sealant 93.

In this liquid crystal device, an image formed in the liquid crystal panel 92 is visible through the transparent input unit 94. When the outer face of the input unit 94, that is, the outer face of the front substrate 94a, is pressed with an input tool (a pen or a rod with a sharp tip), information on the location of the pressed portion is input.

However, in the conventional liquid crystal device capable of input operations, the input portion is locally deformed when the surface of the input unit 94 is pressed with the tip of the input tool. The deformation generates slight deflection in the first substrate 92a of the liquid crystal panel 92 which is stacked on the input unit 94. Since the gap between the substrates of the liquid crystal panel 92, that is, the cell gap, is at most 5 to 10 $\mu$m, slight deflection of the first substrate 92a causes a significant localized change in the cell gap of the liquid crystal panel 92, resulting in a distortion pattern in the image displayed in the liquid crystal device.

Since the back substrate 94b of the input unit 94 is composed of a hard material such as glass, the device becomes heavy as the input unit 94 becomes thick. Thus, decreased thickness and weight of the device are barely achieved. The liquid crystal device having such problems inhibits trends toward decreasing the size and weight of portable electronic equipments.

SUMMARY OF THE INVENTION

Accordingly, the present invention solves the above problems. An object of the present invention is to reduce distortion of displayed images due to pressing operations of the input unit. Another object of the present invention is to achieve the configuration of a thin and lightweight liquid crystal device capable of input operations.

The present invention is characterized by a liquid crystal device comprising: a liquid crystal panel comprising a first substrate, a second substrate opposing the first substrate and having flexibility, and a liquid crystal layer disposed therebetween; and an input unit arranged at a position which lies at a position overlapping the liquid crystal panel in plan view at the first substrate side; wherein a gap is provided on a side of the second substrate away from the liquid crystal layer.

Also, the present invention is characterized by a liquid crystal device comprising: a liquid crystal panel comprising a first substrate, a second substrate opposing the first substrate and having flexibility, and a sealant and a liquid crystal layer disposed therebetween; an input unit arranged at a position which lies at a position overlapping the liquid crystal panel in plan view at the first substrate side; and a supporting section arranged at a position away from the liquid crystal layer of the second substrate; wherein the supporting section is arranged at a position corresponding to a region for forming the sealant.

The second substrate having flexibility is provided so as to be readily deflected along with the deflection of the first substrate. That is, the gap is provided on a side of the second substrate away from an image observing side, or the supporting section is arranged at a position corresponding to a region for forming the sealant.

When the a pressing operation is performed on the input unit, the first substrate is locally deflected by the pressing operation. The second substrate having flexibility is readily deflected along with the deflection of the first substrate. As a result, a localized change in the cell gap of the liquid crystal panel is suppressed.

When a position detecting element is disposed between the front-side substrate and the back-side substrate in the input unit and when the back-side substrate is directly or indirectly stacked on the first substrate, the input unit has a structure in which the position detecting element is disposed between these two substrates. Thus, this device can be produced by independently producing the input unit and the liquid crystal panel and by stacking them. Thus, the productivity and the yield of the device can be improved. Since the two substrates arranged on both sides of the position detecting element are flexible, the thickness and the weight of the input unit can be reduced.

Preferably, the second substrate has higher flexibility than that of a structure disposed between the position detecting element of the input unit and the liquid crystal of the liquid crystal panel. When the structure includes a plurality of components and when one component has significantly lower flexibility compared to the other components (for example, significantly thicker or significantly harder than those of the others), the flexibility of this structure may be substantially the same as the flexibility of the component having the least flexibility. This component may be the first substrate, or the back-side substrate when the back-side substrate opposing the front-side substrate with the position detecting means therebetween is provided in the input unit, or the illumination means (for example, a light guide plate) when the illuminating means for illuminating the liquid crystal panel is provided between the input unit and the liquid crystal panel. The pressure applied to the input unit by the pressing operation is absorbed by the above structure or the above member having hardness or low flexibility. The localized deflection of the above structure or the above member caused by the stress of the pressing operation to the input unit is suppressed by some extent due to the low flexibility thereof, but the deflection acts toward a localized change in the cell gap of the liquid crystal panel. Since the second substrate has higher flexibility than that of the structure or the member, the second substrate is also deflected in response to the deflection of the structure or the member so as to suppress a localized change in the cell gap.

Herein, "flexibility" means a mechanical property causing relatively large deflection when a pressure (for example 0.5 to 5 N), which is generated when an operator puts an input tool into contact with a component, is applied. "Relatively large deflection" in this case means a deflection which is the same or more than that of the cell gap of the liquid crystal panel (for example, 5 to 10 μm or more). The flexible second substrate is effective for suppressing the display distortion of the liquid crystal panel caused by the pressing operations to the input unit. In contrast, the first substrate and the above member are preferably "hard" or "less flexible". Herein "hard" or "less flexible" means a property causing a deflection (for example, 0.1 to 3 μm or less) corresponding to a change in the cell gap which causes a change in the display state of the liquid crystal panel but not causing a deflection larger than the change in the cell gap when a pressure (for example 0.5 to 5 N), which is generated when an operator puts an input tool into contact with a component, is applied.

In addition, the supporting section is provided so as to directly or indirectly support the second substrate and the supporting section provides the gap at a side of the second substrate away from the operator. It is preferable that the supporting section support the second substrate in a peripheral region of the liquid crystal display region of the liquid crystal panel, because the supporting section securely supports the liquid crystal panel without affecting the cell gap and sufficiently absorbs the deflection of the second substrate. When the liquid crystal panel is provided with the sealant for enclosing the liquid crystal between the first substrate and the second substrate, the supporting section supports the second substrate at the position corresponding to the region for forming the sealant. Thus, the liquid crystal panel can be securely supported without deflection of the second substrate. Preferably, the supporting section extends along the region for forming the sealant and surrounds the gap in order to stably support the liquid crystal panel.

When an illumination means is provided for illuminating the liquid crystal panel with light from a side away the input unit, a gap is provided between the second substrate and the illumination means. The illumination means may have a light guide plate which deflects light from a light source towards the liquid crystal panel. In this case, the light guide plate faces the second substrate at the gap. The light guide plate may have a supporting section for directly or indirectly supporting the second substrate. A supporting section may be provided for directly or indirectly supporting the second substrate and the supporting section may provide a gap between the second substrate and the illumination means. The supporting section is preferably arranged at a position corresponding to a region for forming the sealant, as described above.

In this case, a so-called transflective panel may be formed by providing a reflective layer at the second substrate side and by providing an opening for transmitting the illuminating light from the illumination means to the reflective layer. This panel can be used as a reflective panel when the environment is bright or as a transmissive panel when the environment is dim.

Another possible idea is to provide an illumination means which illuminates the liquid crystal panel with light from a side of the observer. In this case, a reflective layer is provided at the second substrate side. Preferably, the illumination means is arranged between the input unit and the liquid crystal panel and has a light guide plate which deflects light from the light source towards the liquid crystal panel. Since the light guide plate provided between the input section and the liquid crystal panel absorbs the stress when the pressing operation is performed to the input unit, the distortion of the display in the liquid crystal panel during the pressing operation is suppressed. Preferably, the second substrate has higher flexibility than that of the composite structure of the light guide plate and the first substrate. Moreover, it is preferable that the first substrate also have flexibility in order to reduce the thickness and the weight of the liquid crystal panel.

When a casing is provided for supporting the input unit and the liquid crystal panel, it is preferable that the second substrate be directly or indirectly supported by the casing and the second substrate is provided with a gap at a side away from the liquid crystal layer. Preferably, the casing supports the second substrate at a position corresponding to a region for forming the sealant. The supporting section may directly or indirectly support the second substrate at a position corresponding to a periphery of the display region in the liquid crystal panel. When a sealant is provided for enclosing the liquid crystal between the first substrate and the second substrate, the casing preferably directly or indirectly supports at a position corresponding to a region for forming the sealant. In particular, the casing preferably has a supporting section which extends along the region for forming the sealant and surrounds the gap, in order to stably mount the liquid crystal device into the casing.

The liquid crystal device capable of input operations is built in various electronic equipments and functions as an input unit for inputting information to the electronic equipments. Examples of electronic equipments include information processing terminals, such as personal computers, including processing units such as a micro processor unit (MPU), electronic clocks and watches, such as wrist watches, communication devices, such as portable phones and facsimiles, and printing devices, such as printers and electronic copying machines.

DETAILED DESCRIPTION OF THE PREFERRED EMBODIMENTS

Figure 1:
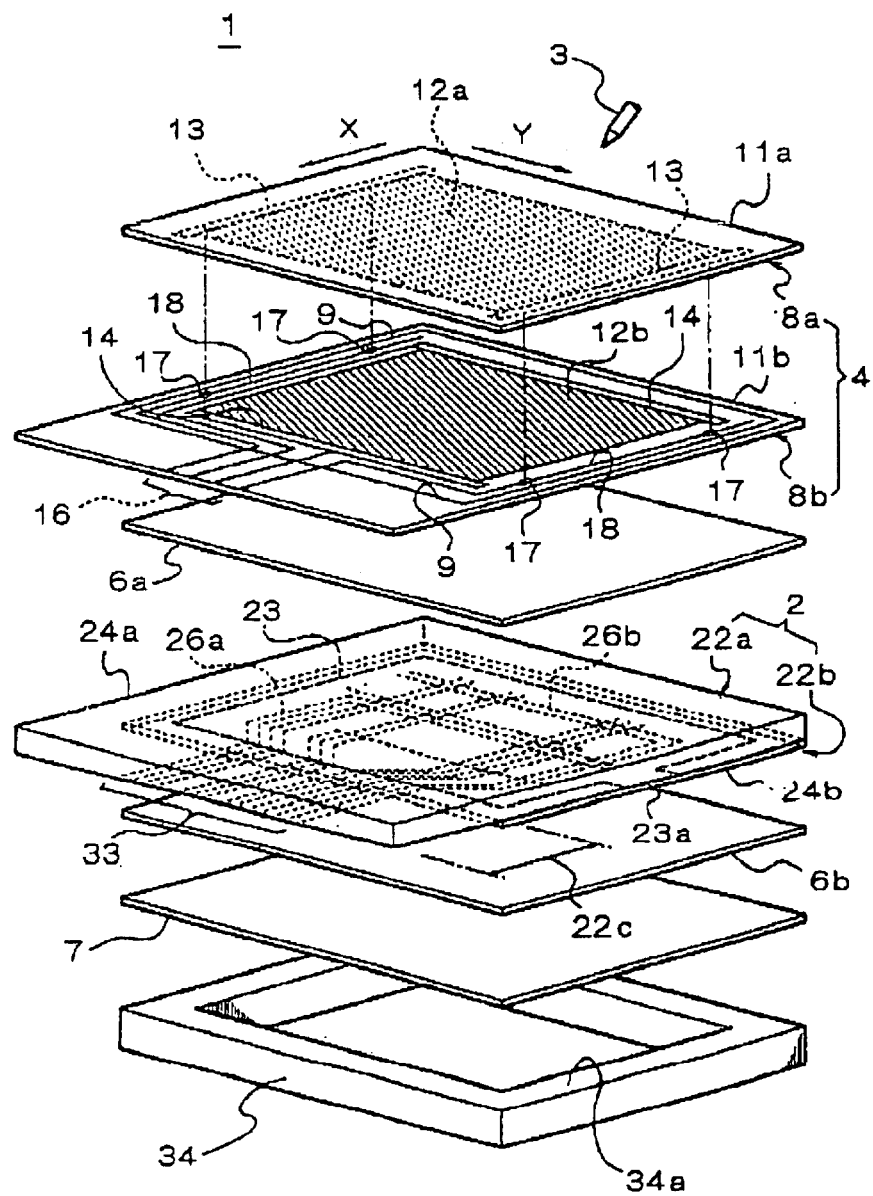
FIG. 1 is an exploded perspective view of the structure of a first embodiment of a liquid crystal device capable of input operations in accordance with the present invention.

A modification for decreasing the thickness and the weight of the conventional liquid crystal device capable of input operations shown in FIG. 12 will now be described. As shown in FIG. 13, a possible liquid crystal device for improving the conventional one has an input unit 94' including a back substrate 94c formed of a thin flexible material instead of the hard back substrate 94b. Since both the front substrate 94a and the back substrate 94c of this liquid crystal device are formed of flexible materials, such as a thin plastic substrate and a thin glass substrate, the thickness and the weight of the input unit 94 can be reduced, resulting in decreased thickness and weight of the overall liquid crystal device.

Since the back substrate 94c of the input unit 94 of this liquid crystal device, however, is formed of the flexible material, local pressing of the surface of the input unit 94 causes significant deformation of the back substrate 94c and thus significant deflection of the first substrate 92a of the liquid crystal panel 92. As a result, the distortion pattern in the image displayed in the liquid crystal is noticeable compared to the conventional configuration. The following embodiment relates to a further modification of this liquid crystal device capable of input operations.

Preferred embodiments in accordance with the present invention will now be described in detail with reference to the attached drawings. FIG. 1 shows an embodiment of the liquid crystal device capable of input operations in accordance with the present invention. The liquid crystal device 1 has a liquid crystal panel 2 for displaying visible images, such as letters and figures, and an input unit 4 for inputting data by putting an input tool 3 into contact therewith. The input unit 4 is disposed at the upper side in the drawing (hereinafter referred to as "front side") which is a side for observing images of the liquid crystal panel 2 and for input operations of the input unit 4.

A polarizer 6a is disposed between the liquid crystal panel 2 and the input unit 4, whereas a polarizer 6b is disposed at the lower side in the drawing (hereinafter referred to as "back side") of the liquid crystal panel 2, which is a side away from the side for observing the images of the liquid crystal panel 2 and for input operations of the input unit 4. A reflector 7 is disposed at the back side of the polarizer 6b. The reflector 7 may be integrated with the polarizer 6b. The polarization axis of the polarizer 6a and the polarization axis of the polarizer 6b define a predetermined angle for achieving transmission of polarized light which is necessary for displaying visible images.

The input unit 4, the polarizer 6a, the liquid crystal panel 2, the polarizer 6b, and the reflector 7 are bonded with a binder or an adhesive.

The reflector 7 is supported by a rectangular frame supporting member 34 arranged at the back thereof. The supporting member 34 has a supporting unit 34a which comes into contact with and supports the peripheral portion of the reflector 7. A space provided in the interior of the supporting unit 34a forms a gap at the back side of the liquid crystal panel 2. This gap allows the deformation of a second substrate 22b toward the back side of the liquid crystal panel 2.

The supporting unit 34a of the supporting member 34 indirectly supports the liquid crystal panel 2, via the polarizer 6b and the reflector 7, in the periphery of the display region of the liquid crystal panel 2. More specifically, the supporting portion of the supporting unit 34a is limited to a planar position which corresponds to a region provided with a sealant 23 in the liquid crystal panel 2.

A front-side substrate 8a of the input unit 4 is prepared by forming a planar electrode 12a on an inner surface of a front-side substrate material 11a comprising a transparent planar resin material, that is, on a surface opposing a back-side substrate 8b so as to cover a region corresponding to the display region of the liquid crystal panel 2, and by forming a pair of low-resistance electrodes 13 on both ends in the Y direction of the planar electrode 12a. On the other hand, the back-side substrate 8b is prepared by forming a planar electrode 12b on an inner surface of a back-side substrate material 11b comprising a transparent planar resin material so as to cover a region corresponding to the display region of the liquid crystal panel 2, and by forming a pair of low-resistance electrodes 14 on both ends in the X direction of the planar electrode 12b.

The input unit 4 is formed by bonding the front-side substrate 8a to the back-side substrate 8b with a sealant 9 provided on the periphery of the back-side substrate 8b; meanwhile, the low-resistance electrodes 13 formed on the front-side substrate 8a are electrically connected to auxiliary electrodes 18 formed on the back-side substrate 8b with conductors 17 therebetween, and are electrically connected to a terminal section 16 by the auxiliary electrodes 18.

Figure 2:
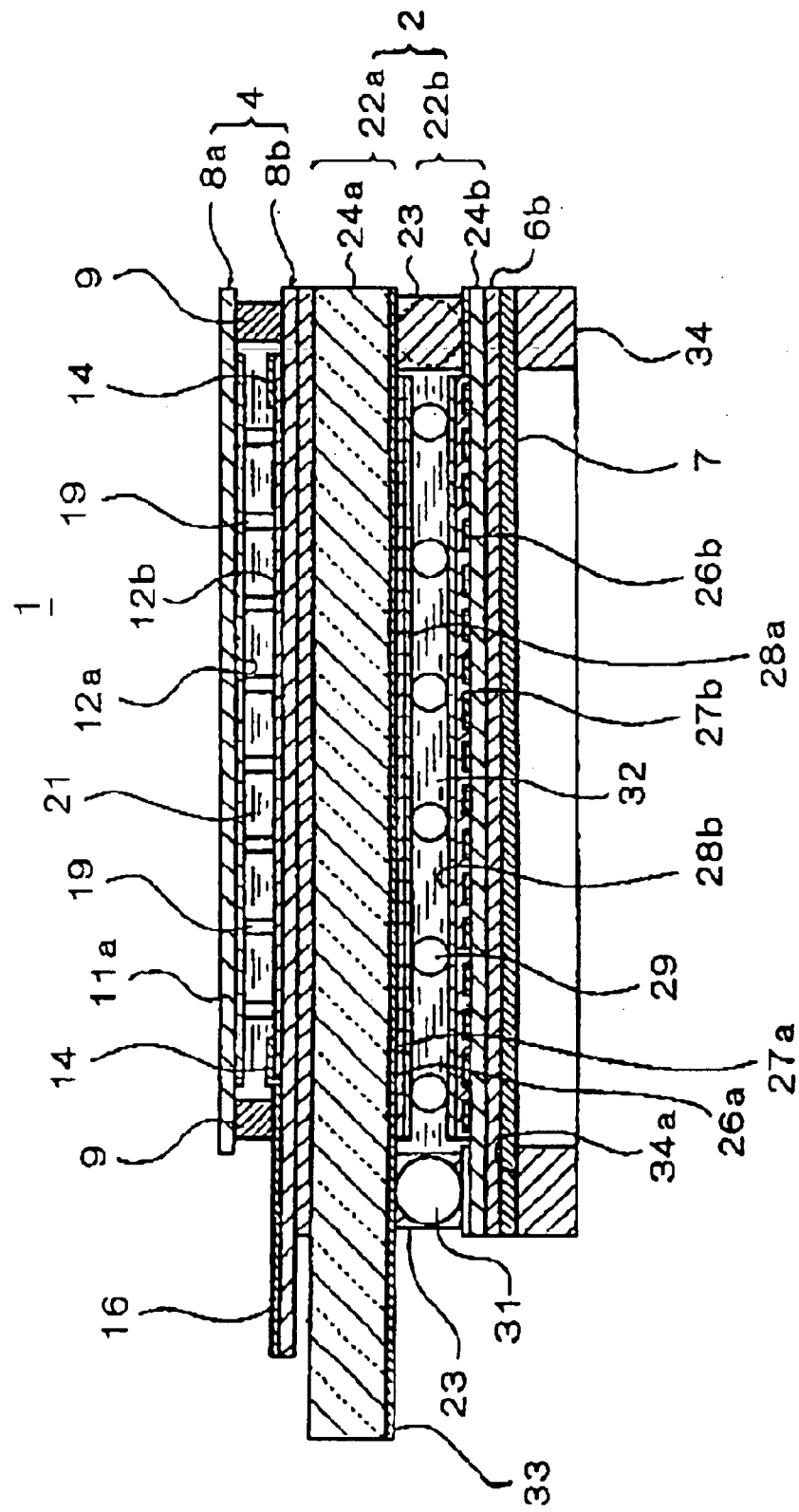
FIG. 2 is a cross-sectional view showing a state of the first embodiment after assembly.

As shown in FIG. 2, the gap between the front-side substrate 8a and the back-side substrate 8b, which are bonded to each other by the sealant 9, is maintained at a predetermined distance by spacers 19 formed on the back-side substrate 8b. The spacers 19 can be simultaneously formed when the sealant 9 is formed. The gap between the frontside substrate 8a and the back-side substrate 8b is filled with liquid 21 for adjusting the refractive index.

Both the front-side substrate material 11a and the back-side substrate material 11b are formed of a thermoplastic material, for example, a plastic film comprising polycarbonate (PC), polyacrylate (PAr), or polyethersulfone (PES). The planar electrodes 12a and 12b are formed of a transparent conductive material, such as ITO (indium tin oxide), and have substantially uniform surface resistance over the entire surfaces. The low-resistance electrodes 13, the low-resistance electrodes 14, the auxiliary electrodes 18, and the terminal section 16 are formed of, for example, silver paste. The refractive index $n_1$ of ITO, which is the material constituting the planar electrode 12a formed on the inner surface of the front-side substrate 8a and the planar electrode 12b formed on the inner surface of the back-side substrate 8b generally ranges from 1.7 to 1.9. Considering that if an air layer is present between the front-side substrate 8a and the back-side substrate 8b, a difference in refractive index between the planar electrode 12a and the air layer and between the planar electrode 12b and the air layer is large, since the refractive index $n_0$ of the air layer is 1.0. Thus, light is significantly reflected at the interface therebetween. As a result, when an image displayed in the liquid crystal panel 2 is viewed from the exterior of the front-side substrate 8a, the displayed image will be dimmed by reflection of light at the interface.

In this embodiment, the gap between the front-side substrate 8a and the back-side substrate 8b is filled with a liquid 21 having a refractive index n in a range of 1.0 to 1.9 so that a difference in refractive index between the ITO of the planar electrode 12a and the liquid is smaller than the difference in the refractive index between the air layer and the ITO. Thus, reflection at the substrate interface when the image displayed in the liquid crystal panel 2 is viewed from the exterior of the front-side substrate 8a can be reduced. A bright image can be thereby displayed.

As shown in FIG. 1, the liquid crystal panel 2 has a first substrate 22a and a second substrate 22b facing each other. The liquid crystal panel 2 is formed by bonding the first substrate 22a and the second substrate 22b with the sealant 23 which is provided on a surface of one of these substrates.

As shown in FIG. 2, the first substrate 22a is prepared by forming first electrodes 26a on a liquid crystal-side surface of a first substrate member 24a, that is, on a surface opposing the second substrate 22b, by forming an overcoat layer 27a thereon, and by forming an alignment film 28a thereon. The alignment film 28a is subjected to a rubbing treatment so that the alignment film 28a makes the liquid crystal align.

The second substrate 22b is prepared by forming second electrodes 26b on a liquid crystal-side surface of a second substrate member 24b, that is, on a surface opposing the first substrate 22a, by forming an overcoat layer 27b thereon, and by forming an alignment film 28b thereon. The alignment film 28b is subjected to a rubbing treatment so that the alignment film 28b makes the liquid crystal align.

The first electrodes 26a and the second electrodes 26b are formed of, for example, a transparent conductive material, such as ITO. The thickness of these electrodes is generally approximately 1,000 Å. The overcoat layer 27a and the overcoat layer 27b are formed of, for example, silicon oxide, titanium oxide, or a compound containing these oxides. The thickness of these layers is generally approximately 800 Å. The alignment films 28a and 28b are formed of, for example, a polyimide resin. The thickness of these films is generally approximately 800 Å.

The first electrodes 26a have a stripe pattern including a plurality of lines which are parallel to each other. Also, the second electrodes 26b have a stripe pattern including a plurality of lines which are parallel to each other and which are perpendicular to the first electrodes 26a. A plurality of regions in which these first electrodes 26a and 26b intersect each other form pixels for displaying visible images. A region formed by delimiting the plurality of pixels is a display region of the liquid crystal for displaying visible images, such as letters.

As shown in FIG. 2, a plurality of spacers 29 are dispersed on the liquid crystal-side surface of one of the first substrate 22a and the second substrate 22b, and, as shown in FIG. 1, a frame of the sealant 23 is provided on the liquid crystal-side surface of one of these substrates by, for example, printing. As shown in FIG. 2, conductive members 31 are dispersed in the sealant 23. As shown in FIG. 1, a liquid crystal injection port 23a is formed at a portion of the sealant 23.

By bonding the first substrate 22a to the second substrate 22b with the sealant 23, a gap having a uniform size defined by the spacers 29, for example, approximately 5 μm, a so-called cell gap, is formed between the first substrate 22a and the second substrate 22b. Liquid crystal 32 is injected into the cell gap through the liquid crystal injection port 23a. After the injection of the liquid crystal is completed, the liquid crystal injection port 23a is sealed with resin or the like.

As shown in FIG. 1, the first substrate 22a has a protruding section 22c which protrudes past the second substrate 22b. The first electrodes 26a on the first substrate 22a linearly extend toward the protruding section 22c and constitute a portion for terminal patterns 33. The second electrodes 26b on the second substrate 22b are electrically connected to the other portion of the terminal patterns 33 on the protruding section 22c through the conductive members 31 dispersed in the sealant 23 as shown in FIG. 2. The terminal patterns 33 allow electrical connection of the liquid crystal panel 2 to an external display controlling circuit (not shown in the drawing) in order to drive the liquid crystal panel 2.

In an actual case, many first and second electrodes 26a and 26b and terminal patterns 33 are formed at extremely narrow distances on the first substrate 22a and the second substrate 22b. In FIG. 1, however, these patterns are schematically depicted so as to have distances which are larger than the actual distances and these electrodes are partly omitted, in order to facilitate understanding of the structure. The electrodes 26a and 26b formed in the region enclosing the liquid crystal are not limited to be linear, as shown in FIG. 1, and may have any other pattern.

In this embodiment, the first substrate member 24a constituting the first substrate 22a is formed of a hard material, e.g., glass or hard plastic having a relatively small thickness (for example, at least 0.7 μm). In contrast, the second substrate member 24b constituting the second substrate 22b is formed of a flexible material, e.g., a hard plastic having a relatively small thickness (for example, not more than 0.5 mm), a soft plastic, or glass having a relatively small thickness (for example, not more than 0.5 mm).

In the input unit 4, the terminal section 16 is connected to an input controlling circuit (not shown in the drawing) which applies a predetermined voltage to the low-resistance electrodes 14 lying at both edges in the X direction of the back-side substrate 8b at a certain time, whereas a voltage measuring means (voltage measuring circuit or voltage measuring element, not shown in the drawing) in the input controlling circuit is electrically connected to the low-resistance electrodes 13 lying at both edges in the Y direction of the front-side substrate 8a.

Figure 3:
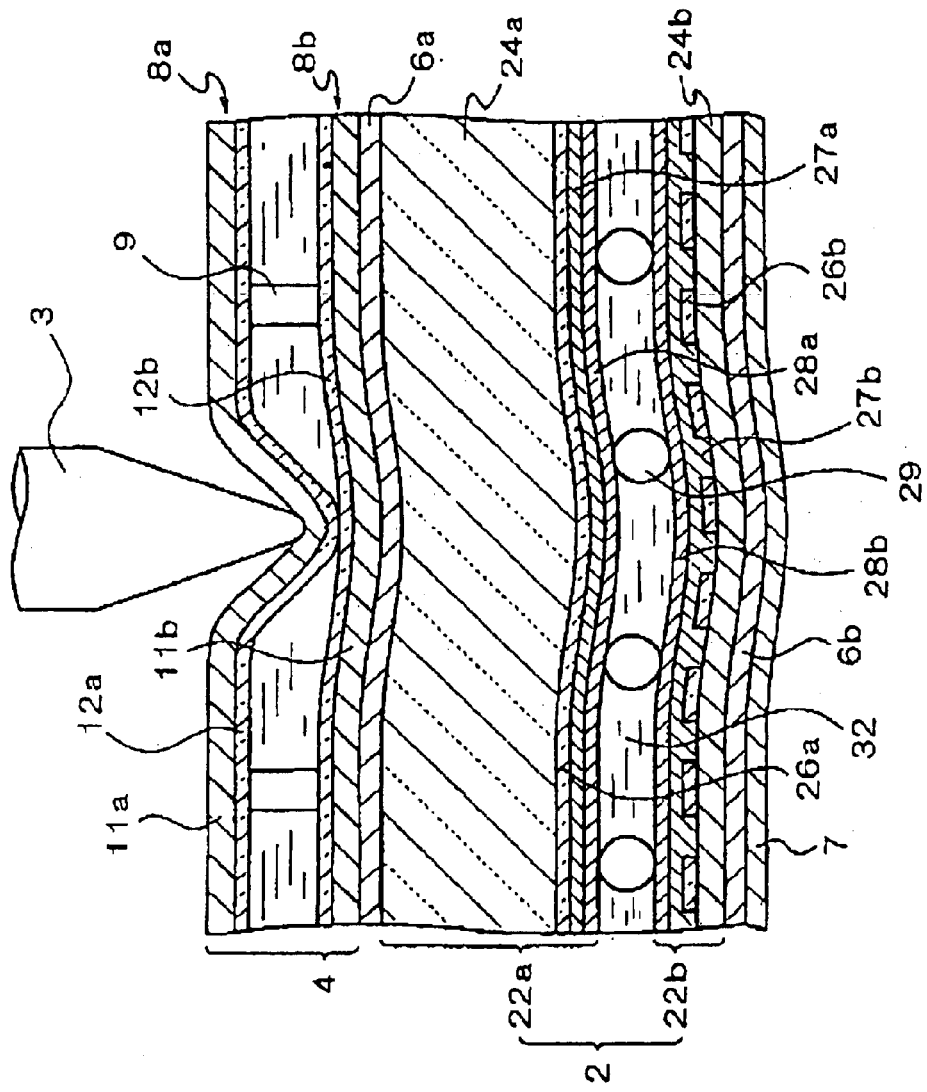
FIG. 3 is an enlarged cross-sectional view showing an input operation of the liquid crystal device of the first embodiment.

At this time, a uniform voltage drop occurs in the planar electrode 12b of the back-side substrate 8b in which the potential linearly changes along the X direction to generate a potential distribution having substantially the same potential at positions having the same coordinate in the X direction. As shown in FIG. 3, when the tip of the input tool 3 presses a certain position of the front-side substrate 8a in a region corresponding to the display region of the liquid crystal panel 2, the planar electrode 12a of the front-side substrate 8a comes into contact with the planar electrode 12b of the back-side substrate 8b. Thus, the potential of the planar electrode 12b at the position pressed by the input tool 3 is measured by the input controlling circuit through the planar electrode 12a on the front-side substrate 8a. Since the measured potential is in relation to the coordinate of the pressed position in the X direction, the input controlling circuit can detect the position in the X direction pressed by the input tool 3.

At another time, the input controlling circuit applies a predetermined voltage to the low-resistance electrodes 13 lying at both edges in the Y direction on the front-side substrate 8a, and the low-resistance electrodes 14 lying at the both edges in the Y direction of the back-side substrate 8b are connected to the voltage measuring means.

At this time, a uniform voltage drop occurs in the planar electrode 12a of the front-side substrate 8a in which the potential linearly changes along the Y direction to generate a potential distribution having substantially the same potential at positions having the same coordinate in the Y direction. The potential of the planar electrode 12a at the front-side substrate 8a at the position pressed by the input tool 3 is measured by the input controlling circuit through the planar electrode 12b on .the back-side substrate 8b. As a result, the input controlling circuit can detect the pressed position in the Y direction, as in the position in the X direction.

In the liquid crystal panel 2, the light reflected by the reflector 7 passes through the liquid crystal layer in the liquid crystal panel 2 and is observed by an operator. The terminal patterns 33 of the liquid crystal panel 2 are electrically connected to a display controlling circuit (not shown in the drawing) for driving the liquid crystal. The display controlling circuit applies a scanning voltage to each line of either the first electrodes 26a or the second electrodes 26b, and applies data voltages to the other electrodes based on the image to be displayed. Since the light, which is reflected by the reflector 7 and passes through pixels selected by the both applied voltages, is modulated in response to the voltages applied to the liquid crystal 32, the visible image such as letters and figures can be viewed from the exterior of the first substrate 22a.

In the liquid crystal device 1 capable of input operations of this embodiment, an appropriate input image, for example, an image including a plurality of regions to be selected is displayed in the display region of the liquid crystal panel 2. The operator presses a required position of the input image, for example, a surface position of the front-side substrate 8a in the input unit 4 corresponding to one of the regions to be selected. The input controlling circuit connected to the input unit 4 reads the coordinates in the X and Y directions of the pressed position, and recognizes which region of the plurality of region to be selected in the input image is selected by the operator.

In the liquid crystal device capable of input operations as shown in FIG. 13, the input unit 94' comprises the front substrate 94a and the back substrate 94b, which are composed of flexible members. The localized deformation in the input unit 94' generated by pressing with the input tool 3 results in a significant and localized change in the cell gap of the liquid crystal panel 2. Thus, pressing with the input tool 3 produces a distortion pattern which reduces the usefulness of the device.

In contrast, in the liquid crystal device 1 capable of input operations in accordance with this embodiment shown in FIG. 1, no distortion pattern occurs in the display region of the liquid crystal panel 2, as shown in FIG. 3, when the tip of the input tool 3 presses the input unit 4. Thus, the liquid crystal device 1 can be used in practice without trouble. The reason for lack of a distortion pattern when the liquid crystal device 1 of this embodiment is pressed is considered as follows.

When the tip of the input tool 3 presses the front-side substrate 8a of the input unit 4, as shown in FIG. 3, the pressed position of the front-side substrate 8a is deflected in the pressed direction and the corresponding position of the planar electrode 12a comes into contact with the planar electrode 12b of the back-side substrate 8b. The back-side substrate 8b is also deflected at the contact point in the pressed direction. This deflection affects the first substrate 22a of the liquid crystal panel 2 and causes slight deflection of the first substrate 22a.

Figure 12:
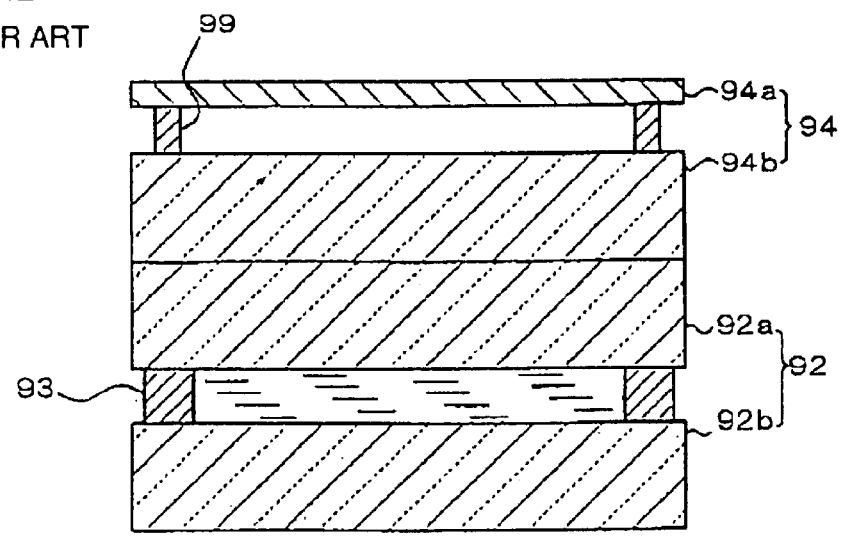
FIG. 12 is a schematic cross-sectional view of the structure of a conventional liquid crystal device capable of input operations.
Figure 13:
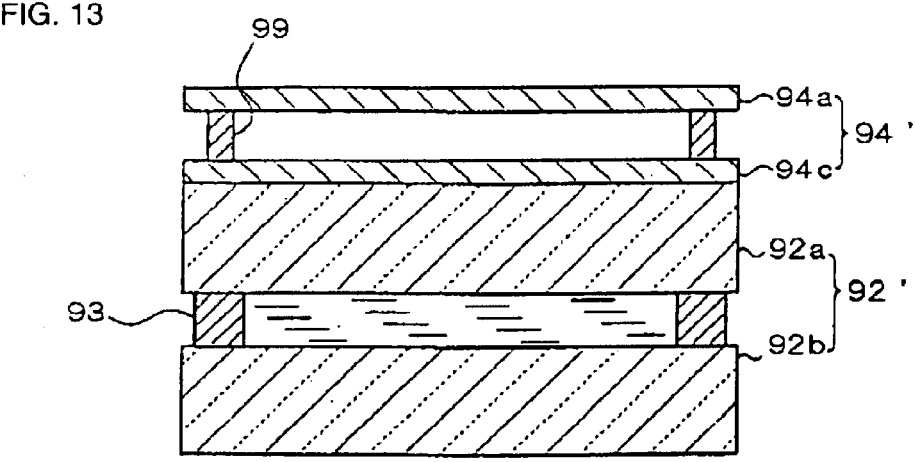
FIG. 13 is a schematic cross-sectional view of the structure of a modified liquid crystal device capable of input operations.

In the liquid crystal device shown in FIGS. 12 and 13, the second substrate 92b is formed of a hard material, such as relatively thick glass. When the first substrate adjacent to the input unit 4 is deformed, the second substrate opposing the first substrate with the liquid crystal 32 therebetween is not easily deformed. Since the second substrate does not follow the deformation of the first substrate, the cell gap of the liquid crystal panel 2 is decreased in a region corresponding to the pressed position compared to the periphery thereof. Since the cell gap of the liquid crystal panel is as significantly small as 5 µm, slight deflection of the first substrate generates a distortion pattern on the displaying screen of the liquid crystal panel.

In contrast, in this embodiment shown in FIG. 3, the second substrate member 24b of the second substrate 22b is formed of a flexible material having higher flexibility than the first substrate member 24a of the first substrate 22a. Thus, the second substrate 22b is readily deflected. When the first substrate 22a is deflected due to the effect of the input unit 4, the second substrate 22b is also readily deflected dependent on the deflection of the first substrate 22a. Thus, the cell gap of the liquid crystal panel 2 is barely changed in a region corresponding to the pressed position, and no distortion pattern is considered to be generated at the pressed position.

Accordingly, it is preferable that the second substrate 22b have high flexibility and the first substrate 22a have low flexibility in order to prevent the generation of the distortion pattern on the display of the liquid crystal panel 2.

In this embodiment, the flexibility of the second substrate 22b is maintained, as shown in FIGS. 1 and 2, by the frame supporting member 34, which supports the periphery of the second substrate 22b and allows deflection of the interior of the second substrate 22b toward the back side. In this case, the supporting unit 34a of the supporting member 34 indirectly supports the second substrate 22b via the polarizer 6b and the reflector 7. Since the polarizer 6a and the reflector 7 generally have sufficiently higher flexibility that of the second substrate 22b, these allow the deflection of the second substrate 22b. The second substrate 22b may be directly supported by the supporting member 34 by setting the dimensions of the polarizer 6b and the reflector 7 so that the outer peripheries of the polarizer 6b and the reflector 7 are present in the interior of the inner edges of the supporting unit 34a.

The supporting unit 34a of the supporting member 34 supports the peripheral region including the sealant 23 of the liquid crystal panel 2 from the back side. Since the liquid crystal panel 2 has a cell structure including the first substrate 22a and the second substrate 22b bonded to each other with the sealant 23, the supporting unit 34a supports a portion overlapping the sealant 23 in plan view, so that the cell structure of the liquid crystal panel 2 is supported in a stabilized state and the deflection of the second substrate 22b is not constrained. In particular, it is preferable that the supporting unit 34a supports only a portion corresponding to the region for providing the sealant 23.

In this embodiment, each of the input unit 4 and the liquid crystal panel 2 includes two substrates which are bonded to each other with a functional layer (a position detection element including the planar electrode 12a and the planar electrode 12b or a light modulation layer including the first electrodes 26a, the second electrodes 26b, and the liquid crystal 32) so that the input unit 4 and the liquid crystal panel 2 can be independently present. Thus, the input unit 4 and the liquid crystal panel 2 are independently prepared, and are bonded to each other using a binder or an adhesive, or are stacked by another means to prepare the liquid crystal device capable of input operations in accordance with this embodiment. Since the liquid crystal device can be produced using a satisfactory input unit 4 and a satisfactory liquid crystal panel 2 after selection, the liquid crystal device can be efficiently produced and the product yield can be increased.

In a possible configuration in this embodiment, the backside substrate 8b of the input unit 4 is omitted, and the surface structures, such as the planar electrode 12b and the low-resistance electrodes 14, to be formed on the backside substrate 8b are provided on the outer face, that is, a surface away from the liquid crystal 32, of the substrate material of the first substrate 22a of the liquid crystal panel 2. In such a case, however, the input unit 4 and the liquid crystal panel 2 cannot be independently produced.

In this embodiment, in FIG. 1, the input unit 4 is a resistance film-type input device having a structure in which terminal electrodes connected to the low-resistance electrodes are concentrated to a single terminal section 16. The input unit 4 may have any configuration other than the above electrode and wiring structure. The input device may be any type other than the above resistance film type.

FIG. 1 shows the structure of the liquid crystal panel 2 which is connected to the display controlling circuit (not shown in the drawing) for driving the liquid crystal via a conductive connection such as a flexible printed circuit (FPC), that is, so-called a chip-on-board (COB) type or a chip-on-flexible-printed-circuit (COF) type panel structure. Instead, a panel structure in which an IC chip built in a display driving circuit for driving the liquid crystal is directly mounted on the substrate of the liquid crystal panel 2, that is, a chip-on-glass (COG) type panel structure may be employed.

Figure 4:
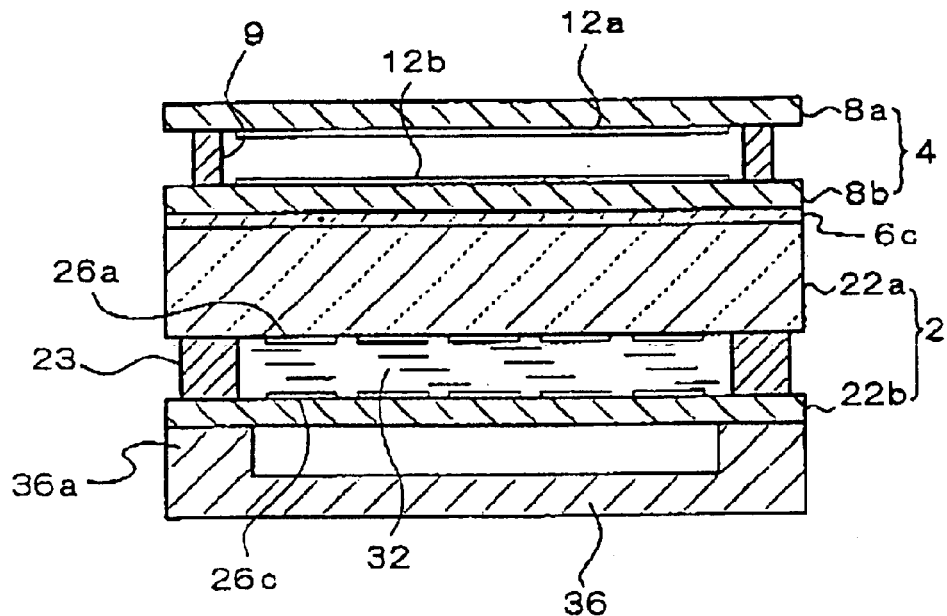
FIG. 4 is a schematic cross-sectional view of the structure of a second embodiment of the liquid crystal device capable of input operations in accordance with the present invention.

Another embodiment differing from the first embodiment will now be described. FIG. 4 is a schematic cross-sectional view of a liquid crystal device capable of input operations in accordance with a second embodiment of the present invention. The detailed structure in this embodiment is substantially the same as that in the first embodiment. Only main components are depicted in the drawing, the components having the same structures are referred to with the same reference numerals while the components having different structures are referred to with different reference numerals.

In the structure in this embodiment, the input unit 4, including the front-side substrate 8a and the back-side substrate 8b bonded to each other with the sealant 9, and the liquid crystal panel 2, including the first substrate 22a and the second substrate 22b bonded to each other with the sealant 23, are stacked with a polarizer 6c therebetween.

In the first embodiment, the polarizer 6b is disposed at the back side of the second substrate 22b and the reflector 7 is provided at the back side thereof, whereas, in this embodiment, electrodes which also function as a reflector, that is, reflective electrodes 26c, are provided on the second substrate 22b of the liquid crystal panel 2, instead of the reflector 7 and the second electrodes 26b. The reflective electrodes 26c are formed of, for example, a metallic thin-film of aluminum. By providing the reflective electrodes 26c, providing a reflector in the exterior of the liquid crystal panel 2 is unnecessary. Thus, the overall thickness of the device can be further decreased.

A plate supporting member 36 having an area which is substantially the same as the area of the input unit 4 and the liquid crystal panel 2 is disposed at the back side of the second substrate 22b. The supporting member 36 is provided with a frame supporting section 36a at the periphery thereof having a thickness larger than that of other portions. The supporting section 36a supports the peripheral portion of the second substrate 22b. As described above, the supporting section 36a supports the second substrate 22b at a position corresponding to the region for forming the sealant 23 of the liquid crystal panel 2.

Figure 10:
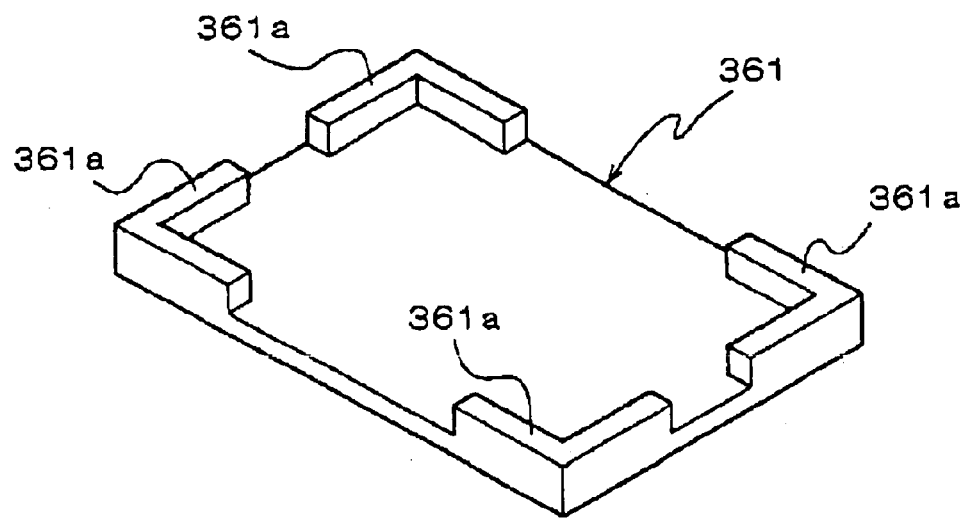
FIG. 10 is a perspective view of a modification of a supporting member of the second embodiment.
Figure 11:
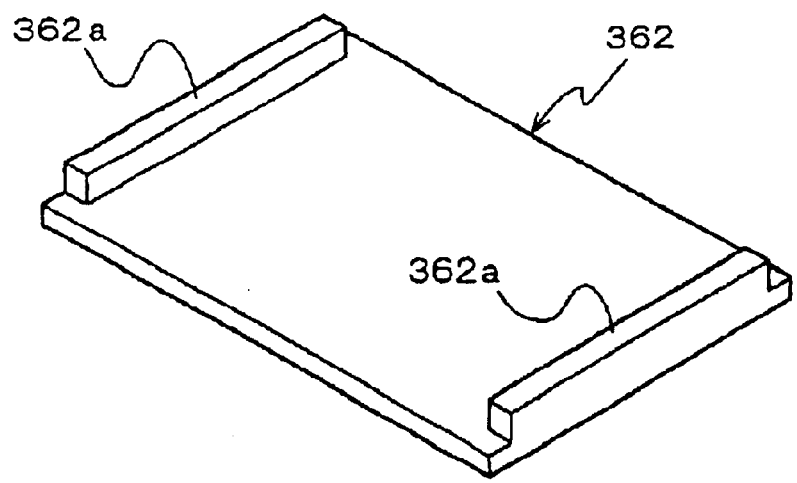
FIG. 11 is a perspective view of another modification of the supporting member of the second embodiment.

FIG. 10 shows a modification of the supporting member 36. A supporting member 361 is, on the whole, a rectangular planar plate. Corners of the supporting member 361 are thick and have supporting sections 361a, each having an L-shaped plane. FIG. 11 shows another modification of the supporting member 36. A supporting member 362 is, on the whole, a rectangular planar plate. The supporting member 362 has a pair of supporting sections 362a on two edges in the longitudinal direction. Each supporting section 362a has a linear plane and is thicker than the peripheries thereof. The supporting member is not limited to the above supporting member 36, supporting member 361, and supporting member 362, as long as the supporting member is provided with supporting sections which are formed so as to support part or all of the peripheral section of the liquid crystal panel 2, particularly positions corresponding to regions of the sealant 23. It is preferable in order to support the liquid crystal panel 2 in a stable state that the supporting sections be substantially uniformly arranged in the periphery of the liquid crystal panel 2, be composed of two or three segments which are separately arranged, or support at least half of the entire periphery.

Figure 5:
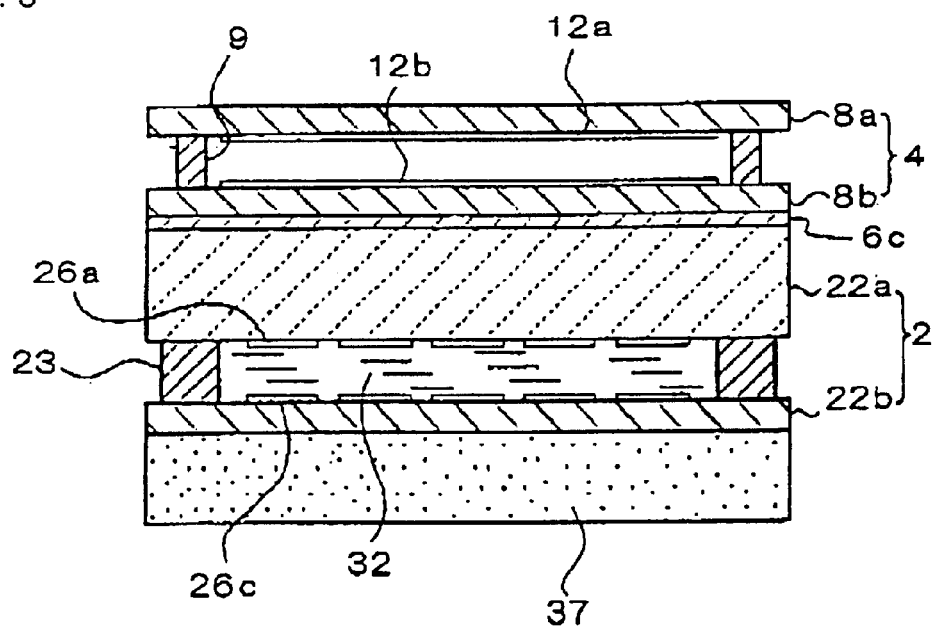
FIG. 5 is a schematic cross-sectional view of the structure of a third embodiment of the liquid crystal device capable of input operations in accordance with the present invention.

FIG. 5 schematically shows a structure of another embodiment in accordance with the present invention. The detailed structure in this embodiment is also substantially the same as that in the first embodiment. Only main components are depicted in the drawing, the components having the same structures are referred to with the same reference numerals while the components having different structures are referred to with different reference numerals.

In this embodiment, the input unit 4 and the liquid crystal panel 2 bonded to each other with the polarizer 6c are provided, as in the second embodiment, and a supporting member 37 arranged at the back side of the liquid crystal panel 2 is formed of a highly flexible material, such as an elastic material, e.g., synthetic rubber, or a gelatinous material. The surface at the front side of the supporting member 37 substantially completely supports the second substrate 22b of the liquid crystal panel 2. It is preferable that the supporting member 37 be more flexible than the second substrate 22b.

In this embodiment, no gap is provided at the back side of the second substrate 22b. Instead, the supporting member 37 supports the second substrate 22b and has high flexibility. When the first substrate 22a of the liquid crystal panel 2 is deformed by the pressure of the input tool 3 when the input unit 4 is pressed by the input tool 3, the supporting member 37 does not substantially inhibit the deformation of the second substrate 22b.

A fourth embodiment in accordance with the present invention will now be described with reference to FIG. 6. In this embodiment, an input unit 4 which is substantially the same as that in the first embodiment and a liquid crystal panel 2 which is substantially the same as that in the second or third embodiment are provided. Reflective electrodes 26d formed of aluminum and having slits (openings) 26e are formed on the material of the second substrate 22b of the liquid crystal panel 2. The opening ratio of the reflective electrode 26d (the ratio of the area of the slits 26e to the total area of the pixel region) is preferably in a range of, for example, 5% to 30%. The use of the reflective electrodes 26d having the opening ratio within this range can maintain both visibility in a bright portion and visibility in a dimmed portion at a practical level by balancing the reflection of the external light incident on the front side and the transmission of illuminating light incident on the back side (illuminating light from a backlight described below).

In this embodiment, a light guide plate 38 constituting the backlight is arranged at the back side of the liquid crystal panel 2 having the above-described translucent panel structure, while a light emitting diode 39 as a light source is arranged at a side of the light guide plate 38. The light guide plate 38 is formed of a transparent resin such as an acrylic resin. The light guide plate 38 has a light guide structure which deflects the light emitted from the light source and ensures uniformity of illuminance to the liquid crystal panel 2. As an example of the light guide structure, a light modulating means 38a, such as an irregular surface section, a printing layer, or a reflective layer having a light scattering or reflecting function, is provided on the back face of the light guide plate 38 so that the degree of light modulation by this means is enhanced at a point distant from the light source. For example, the light modulating means 38a is more densely arranged or the modulation function of the light modulating means 38a is more enhanced at a position distant from the light emitting diode 39 in order to make a planar distribution of the luminous energy illuminated from the upper face of the light guide plate 38 uniform.

Instead of the above configuration, any backlight may be used as long as it functions as a planar light source. For example, the back face of the backlight has a slope so that the back face shifts toward the front side as it becomes distant from the light source, and a light guide plate having a light scattering or reflecting plate on the back face thereof. Alternatively, the backlight may be a substantially planar light source, such as an electroluminescent device.

Figure 6:
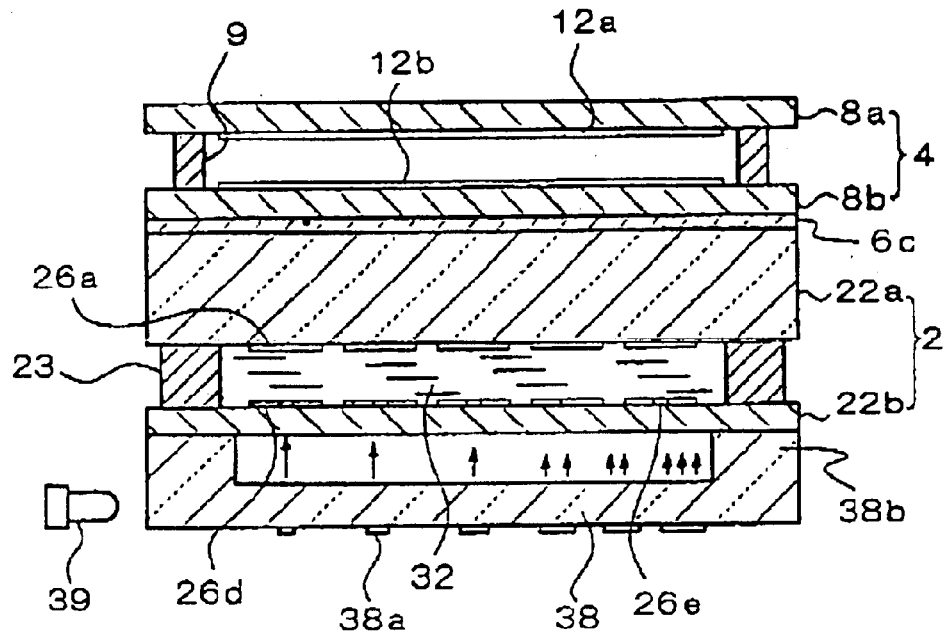
FIG. 6 is a schematic cross-sectional view of the structure of a fourth embodiment of the liquid crystal device capable of input operations in accordance with the present invention.

As shown in FIG. 6, the light guide plate 38 in this embodiment is integratedly provided with a thick supporting section 38b on the periphery thereof. The supporting section 38b directly or indirectly supports the peripheral portion of the second substrate 22b of the liquid crystal panel 2. Thus, a gap is provided between the liquid crystal panel 2 and the light guide plate 38 other than the supporting section 38b. The light guide plate 38 may have any shape, as in the supporting member 36 shown in FIGS. 10 and 11.

The light illuminated from the light guide plate 38 of the backlight passes through the second substrate 22b and the slits 26e of the reflective electrodes 26d, is incident on the input unit 4 from the liquid crystal panel 2, passes through the input unit 4, and emerges at the front side. When the light emitting diode 39 is energized to turn on the backlight, the image is visible in dim places. On the other hand, the image is visible in bright places by ambient light reflected by the reflective electrodes 26d.

Figure 7:
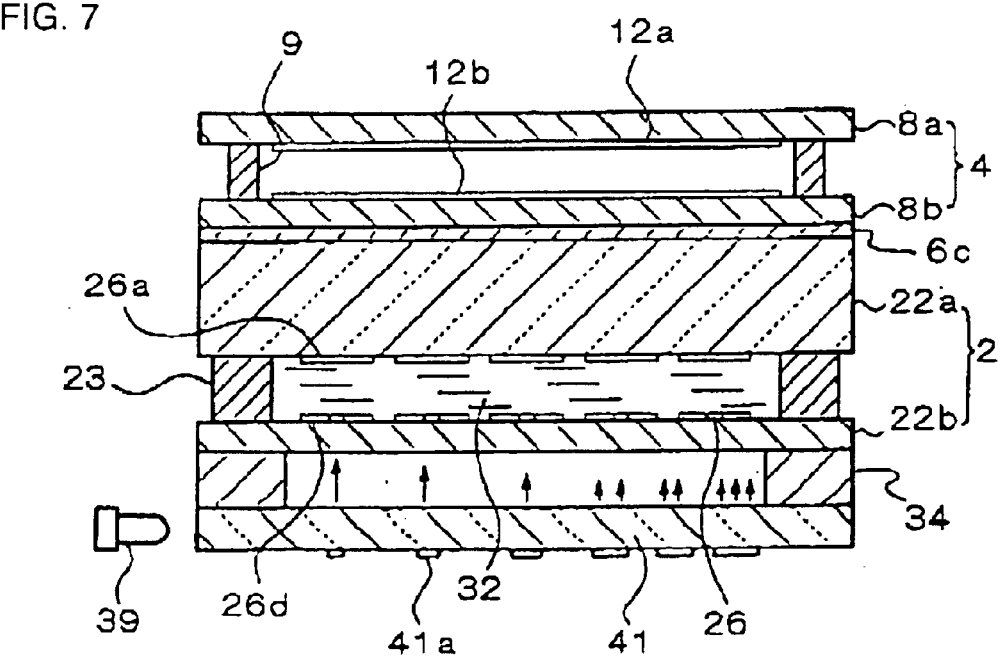
FIG. 7 is a schematic cross-sectional view of the structure of a fifth embodiment of the liquid crystal device capable of input operations in accordance with the present invention.

A fifth embodiment in accordance with the present invention will now be described with reference to FIG. 7. In this embodiment, the input unit 4 and the liquid crystal panel 2 as in the fourth embodiment are provided, the supporting member 34 as in the first embodiment is arranged at the back side of the liquid crystal panel 2, and a light guide plate 41 of the backlight is provided at the back side of the supporting member 34. The supporting member 34 supports a position corresponding to the region of the sealant 23, and the periphery of the light guide plate 41 supports the supporting member 34. The light emitting diode 39 is at a side of the light guide plate 41.

Since the light guide plate 41 is provided with the supporting member 34 in this embodiment, a gap is formed on the light guide plate 41 at the back side of the liquid crystal panel 2. The supporting member 34 may have any shape as long as it supports the periphery of the liquid crystal panel 2 and forms an optical opening so that the light from the light guide plate 41 enters the display region of the liquid crystal panel 2.

Figure 8:
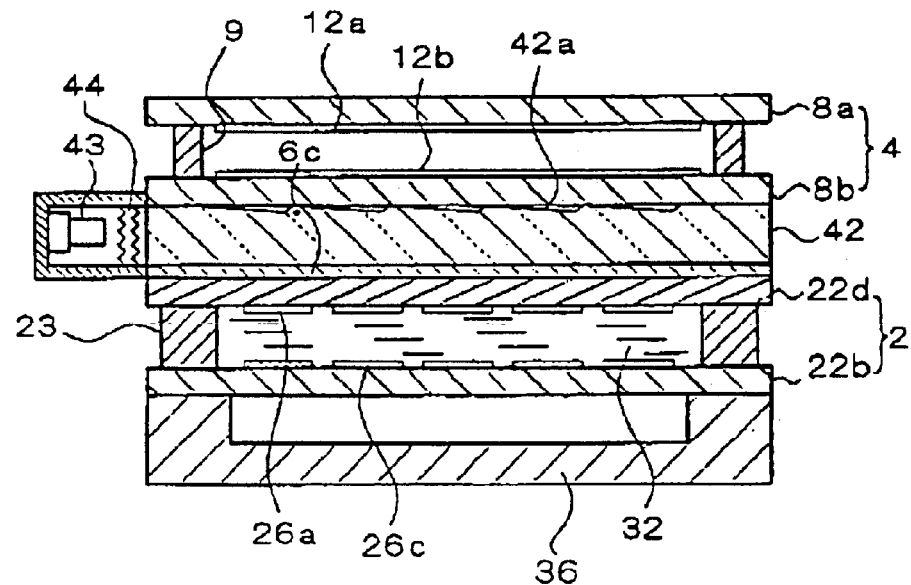
FIG. 8 is a schematic cross-sectional view of the structure of a sixth embodiment of the liquid crystal device capable of input operations in accordance with the present invention.

A sixth embodiment in accordance with the present invention will now be described with reference to FIG. 8. The input unit 4 and the supporting member 36 in this embodiment have the same structures as those in the second embodiment. A light guide plate 42 constituting a front light and the liquid crystal panel 2 are arranged between the input unit 4 and the supporting member 36.

The front light comprises the light guide plate 42 composed of a transparent resin such as an acrylic resin, a chip light emitting diode 43 facing a side face of the light guide plate 42, and a diffusing layer 44 disposed between the chip light emitting diode 43 and the light guide plate 42. A surface structure 42a constituting microprisms is formed on the front-side surface of the light guide plate 42. The surface structure 42a deflects the light which is emitted from the chip light emitting diode 43 and which is incident on side face of the light guide plate 42 toward the back side. The diffusing layer 44 diffuses the light emitted from the chip light emitting diode 43 so as to enhance the intensity and the planar uniformity of the light which is incident on the liquid crystal panel 2 through the light guide plate 42 in cooperation with the above surface structure 42a. Examples of the diffusing layer 44 include a transparent resin having a rough surface or a transparent resin containing microparticles, such as titanium oxide, having a different refractive index from that of the transparent resin.

When the front light is turned on to illuminate the liquid crystal panel 2 from the front side, the light therefrom is incident on the liquid crystal panel 2 and is reflected by the reflective electrodes 26c. The reflected light passes through the light guide plate 42 and is viewed. Thus, the illumination by the front light facilitates observation of the image displayed in the liquid crystal panel 2 in dim places.

In the liquid crystal panel 2 of this embodiment, a first substrate 22d at the front side is formed of a flexible material. Since the light guide plate 42 of the front light is provided between the first substrate 22d and the input unit 4, localized deformation of the back-side substrate 8b caused by pressing the input unit 4 with the tip of the input tool 3 is not readily transmitted to the first substrate 22d. Thus, the localized deformation of the liquid crystal panel 2 can be suppressed to the same extent as in the above embodiments, even when the first substrate 22d is composed of the flexible material. Since the first substrate 22d is formed of the flexible material, two substrates constituting the liquid crystal panel 2 are composed of flexible materials. As a result, the liquid crystal panel 2 can have a further reduced thickness.

The front light is not limited to the above structure, as long as the liquid crystal panel 2 is illuminated from the front side and the front light is transparent so that the image displayed in the liquid crystal panel 2 can be viewed. For example, the front light may be a light guide plate provided with various light guide structures or a planar light source having high transparency, such as an electroluminescent device.

Figure 9:
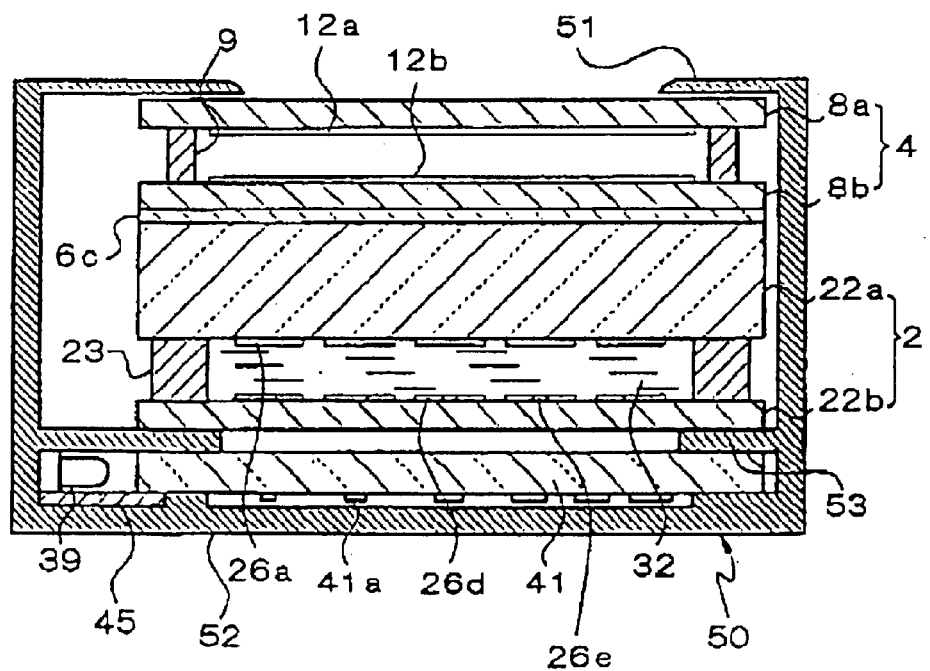
FIG. 9 is a schematic cross-sectional view of the structure of a seventh embodiment of the liquid crystal device capable of input operations in accordance with the present invention.

A seventh embodiment in accordance with the present invention will now be described with reference to FIG. 9. The input unit 4, the polarizer 6c, the liquid crystal panel 2, the light emitting diode 39, and the light guide plate 41 are the same as those in the fifth embodiment. In this embodiment, a casing 50 for containing the overall liquid crystal device capable of input operations is provided, and each component of the liquid crystal device is supported and fixed by the casing 50.

The casing 50 has a front frame section 51 which exposes a planar region corresponding to the display region of the liquid crystal panel 2 and covers the other planar region corresponding to the periphery of the display region, a back plate section 52 which supports the periphery of the back side of the light guide plate 41, and supporting frame sections 53 which extend to the interior of the casing 50 between the front frame section 51 and the back plate section 52 and which form a gap between the liquid crystal panel 2 and the light guide plate 41. Parts of the casing 50, for example, the front frame section 51, the back plate section 52, and the supporting frame sections 53 may be formed of different materials and may be attached and fixed to the other parts by an appropriate means.

The light emitting diode 39 is mounted on a circuit board 45, and the circuit board 45 is fixed onto the inner face of the back plate section 52 of the casing 50. Moreover, a supporting section for supporting the back-side surface of the light guide plate 41 is provided on the inner face of the back plate section 52. The supporting frame sections 53 come into contact with edge portions at the back side of the second substrate 22b to support the liquid crystal panel 2 from the back side and come into contact with edge portions at the front side of the light guide plate 41.

Since the supporting frame sections 53 of the casing 50 form a gap between the liquid crystal panel 2 and the light guide plate 41 in this embodiment, the second substrate 22b can be readily deflected to the back side.

The liquid crystal device capable of input operations of the present invention is not limited to the above embodiments shown in the drawings, and may be modified within the scope of the present invention.

According to the present invention, as described above, the formation of a distortion pattern in the liquid crystal display can be suppressed when the input unit is pressed. The thickness and the weight of the device can be reduced.

What is claimed is:

1. A liquid crystal device comprising:
   a liquid crystal panel comprising a first substrate, a second substrate opposing the first substrate and having flexibility, and a liquid crystal layer disposed therebetween; and
   an input unit arranged at a position which lies at a position overlapping the liquid crystal panel in plan view at the first substrate side;
   wherein a gap is provided on a side of the second substrate away from the liquid crystal layer; and
   wherein the second substrate has higher flexibility than the first substrate.

2. A liquid crystal device comprising:
   a liquid crystal panel comprising a first substrate, a second substrate opposing the first substrate and having flexibility, and a sealant and a liquid crystal layer disposed therebetween;
   an input unit arranged at a position which lies at a position overlapping the liquid crystal panel in plan view at the first substrate side; and
   a supporting frame arranged at a position away from the liquid crystal layer of the second substrate, the supporting frame supporting a periphery of the second substrate;
   wherein the supporting frame includes an opening arranged at a position corresponding to an interior region of the second substrate and wherein the second substrate has higher flexibility than the first substrate.

3. A liquid crystal device comprising:
   a liquid crystal panel comprising a first substrate, a second substrate opposing the first substrate and having flexibility, and a liquid crystal layer disposed therebetween;
   an input unit arranged at a position which lies at a position overlapping the liquid crystal panel in plan view at the first substrate side; and
   an illumination device arranged at a position away from the input unit of the liquid crystal panel;
   wherein the illumination device includes:
      a base portion opposite the liquid crystal panel; and
      a supporting portion extending from the base portion and supporting at least part of a periphery of the second substrate, the supporting portion forming a gap between the second substrate and the base portion of the illumination device; and
   wherein the second substrate has higher flexibility than the first substrate.

4. A liquid crystal device according to claim 3, wherein the base portion and the supporting portion are integral.

5. A liquid crystal device according to claim 3, wherein the base portion and the supporting portion are discrete.

6. A liquid crystal device comprising:
   a liquid crystal panel comprising a first substrate, a second substrate opposing the first substrate and having flexibility, and a sealant and a liquid crystal layer disposed therebetween;
   an input unit arranged at a position which lies at a position overlapping the liquid crystal panel in plan view at the first substrate side;
   an illumination device arranged at a position away from the input unit of the liquid crystal panel; and
   a supporting section arranged between the illumination device and the second substrate;
   wherein the supporting section is arranged at a position corresponding to a region for forming the sealant; and
   wherein the second substrate has higher flexibility than the first substrate.

7. A liquid crystal device comprising:
   a liquid crystal panel comprising a first substrate, a second substrate opposing the first substrate and having flexibility, and a liquid crystal layer disposed therebetween;
   an input unit arranged at a position which lies at a position overlapping the liquid crystal panel in plan view at the first substrate side; and
   a casing supporting the input unit and the liquid crystal panel;
   wherein a frame section of the casing supports the second substrate with a gap on a side of the second substrate away from the liquid crystal layer and wherein the second substrate has higher flexibility than the first substrate.

8. A liquid crystal device according to claim 7, wherein the liquid crystal panel comprises a sealant for enclosing the liquid crystal layer provided between the first substrate and the second substrate, and the casing supports the second substrate at a position corresponding to a region for forming the sealant.

9. A liquid crystal device according to claim 7, wherein the frame section is located between the second substrate and an illumination device to form the gap.

10. An electronic equipment comprising a liquid crystal device according to claim 7.

11. A liquid crystal device comprising:

a liquid crystal panel comprising a first substrate, a second substrate opposing the first substrate and having flexibility, and a sealant and a liquid crystal layer disposed therebetween;

an input unit arranged at a position which lies at a position overlapping the liquid crystal panel in plan view at the first substrate side; and a supporting section arranged at a position away from the liquid crystal layer of the second substrate;

wherein the supporting section is arranged at a position corresponding to a region for forming the sealant; and wherein the second substrate has higher flexibility than the first substrate.

12. A liquid crystal device comprising:

a liquid crystal panel comprising a first substrate, a second substrate opposing the first substrate and having flexibility, and a liquid crystal layer disposed therebetween;

an input unit arranged at a position which lies at a position overlapping the liquid crystal panel in plan view at the first substrate side; and an illumination device arranged at a position away from the input unit of the liquid crystal panel;

wherein a gap is provided between the second substrate and the illumination device; and wherein the second substrate has higher flexibility than the first substrate.

13. A liquid crystal device comprising:

a liquid crystal panel comprising a first substrate, a second substrate opposing the first substrate and having flexibility, and a liquid crystal layer disposed therebetween;

an input unit arranged at a position which lies at a position overlapping the liquid crystal panel in plan view at the first substrate side; and a casing for supporting the input unit and the liquid crystal panel;

wherein the second substrate is supported by the casing and a gap is provided on a side of the second substrate away from the liquid crystal layer; and wherein the second substrate has higher flexibility than the first substrate.

* * * * *

UNITED STATES PATENT AND TRADEMARK OFFICE
CERTIFICATE OF CORRECTION

PATENT NO. : 6,812,974 B1
DATED : November 2, 2004
INVENTOR(S) : Shoji Hinata et al.

It is certified that error appears in the above-identified patent and that said Letters Patent is hereby corrected as shown below:

Title page,
Item [75], Inventors, residence "Nagano-ken" should be -- Minamiazumi-gun --.
Item [56], References Cited, FOREIGN PATENT DOCUMENTS,
"JP 1-167097" should be -- JP 11-167097 --.

Column 1,
Line 51, "equipments" should be -- equipment --.

Column 2,
Line 18, delete "a".

Column 3,
Line 35, after "away" insert -- from --.

Column 4,
Lines 23, 24-25 and 25, "equipments" should be -- equipment --.

Column 6,
Line 57, "no" should be -- $n_0$ --.

Column 10,
Line 36, after "flexibility" insert -- than --.

Signed and Sealed this

Sixteenth Day of August, 2005

JON W. DUDAS
*Director of the United States Patent and Trademark Office*